I. DESY.
ATTACHMENT FOR DISK PLOWS.
APPLICATION FILED OCT. 31, 1914.
1,144,176.
Patented June 22, 1915.
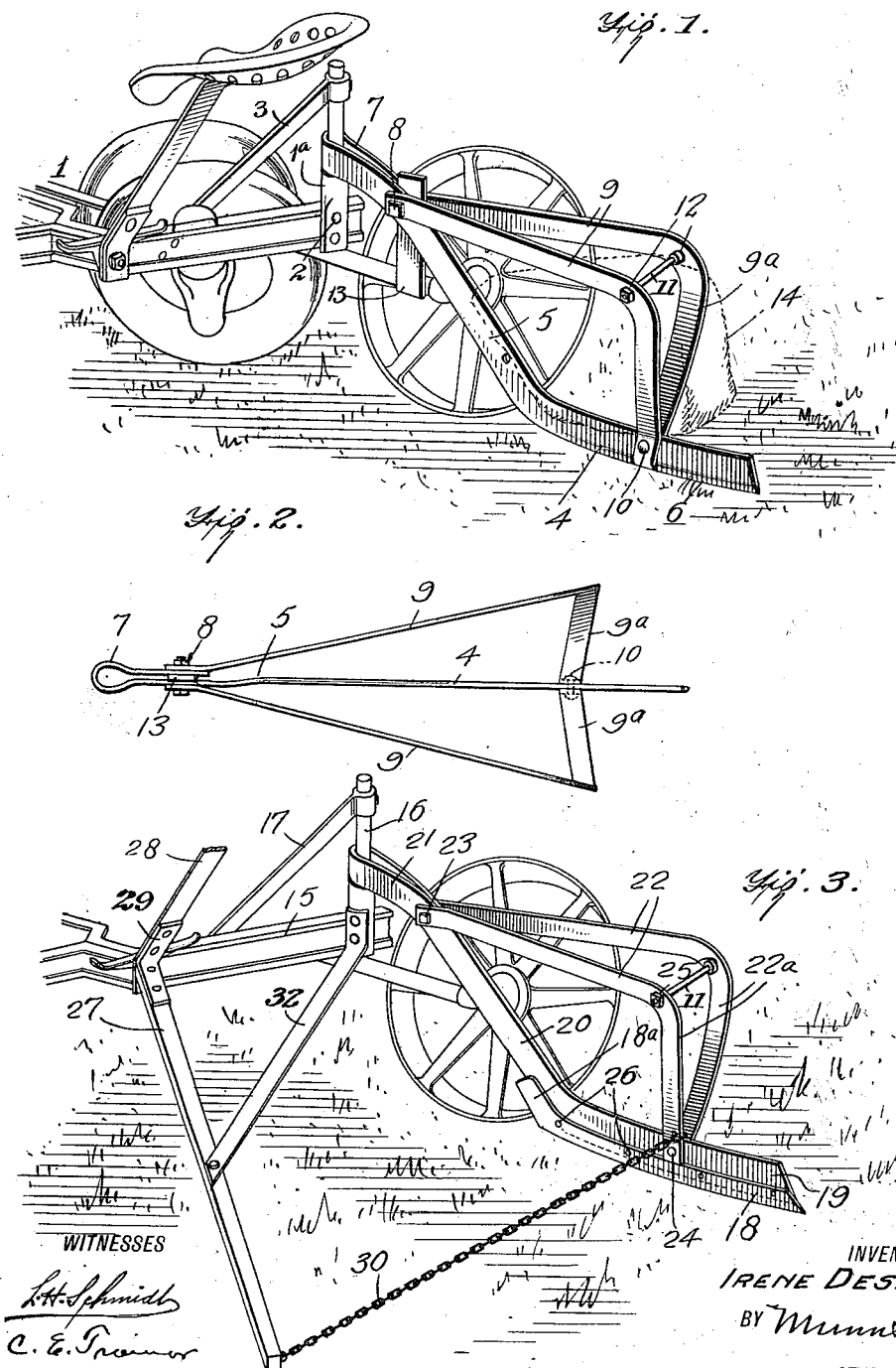

UNITED STATES PATENT OFFICE.

IRENE DESY, OF LEWISTOWN, MONTANA.

ATTACHMENT FOR DISK PLOWS.

1,144,176.  Specification of Letters Patent.  Patented June 22, 1915.

Application filed October 31, 1914. Serial No. 869,631.

*To all whom it may concern:*

Be it known that I, IRENE DESY, a citizen of the United States, and a resident of Lewistown, in the county of Fergus and State of Montana, have invented a new and useful Improvement in Attachments for Disk Plows, of which the following is a specification.

My invention is an improvement in attachment for disk plows, and has for its object to provide a device of the character specified, designed to steady the plow and hold it in the furrow especially when plowing in hard ground and when passing over rocks or other obstructions.

In the drawings, Figure 1 is a perspective view of the attachment in place looking from the rear, Fig. 2 is a top plan view of the attachment detached, and Fig. 3 is a perspective view from the rear of the attachment connected to a gang plow.

The present embodiment of the invention is shown in connection with a disk plow 1, of ordinary construction, and the plow is provided with an upright 1ª at its rear end, the said upright being secured to the frame in any desired manner as indicated at 2, and preferably the upright is braced against the frame as shown at 3.

The attachment comprises a blade support 4, having at its front end an upwardly and forwardly extending shank 5. The support and blade are integral in the present instance, and the blade is beveled on its lower side to form a cutting edge 6, as shown. At its front end the shank is provided with a loop 7, for engaging the upright, and the loop fits loosely over the upright as shown. The loop is formed in the present instance by doubling back a portion of the shank upon itself and securing the said portion to the body of the shank in any desired manner, in the present instance, by means of a pivot bolt 8.

A pair of angle bars is secured to the blade near its rear end, each bar consisting of a portion 9 and a portion 9ª, extending at approximately a right angle with respect to each other. The portions 9ª are secured at their lower ends to the blade as indicated at 10, and from the blade the said portions diverge outwardly in Y-shape as shown. At their angles the angle bars are secured together by means of a brace 11, the brace engaging openings 12 in the angle bars.

A vertical plate 13 is secured to the front end of the shank by means of the bolt 8 before mentioned, the said plate extending slightly above the shank and for some little distance below as shown. Thus the attachment is suspended for free lateral swinging movement and also for vertical movement on the upright. It is entirely free from the disk plow with the exception of the loop 7 with the upright or standard.

The attachment is so arranged with respect to the plow that the lower edge of the blade moves in the furrow left by the outermost disk, that is, the disk remote from the plowed ground. If desired, a weight, indicated at 14 may be supported by the angle arms 9—9ª, and these arms are braced together in such manner that they will hold the weight. The weight 14 may be a stone or any other desired body having sufficient weight.

The device may also be used in connection with a gang plow, in which case it will be arranged as shown in Fig. 3. In either case however, the blade runs in the furrow, that is, adjacent to the unplowed ground. The blade and shank combined form a species of runner, and it will be noticed that the shank is at an obtuse angle with respect to the blade.

The plate 13 contacts at its lower end with the axle of the rear wheel of the plow, and holds the follower from leaving its proper course. It also prevents the plow from leaving its course when rocks and hard ground are encountered, holding the plow rigidly in position. In exceptionally hard ground the weight is used, while in ordinary ground it may be dispensed with. The plate 13 prevents both the follower and the plow from displacement, and even when the plow engages rocks, hard ground or like obstruction, the parts hold their relative position. The device which may be considered as a runner may be swung easily, in the construction of Fig. 1, to the left, but the swinging movement to the right is limited by the plate 13. It is obvious that the blade may be integral with the blade support, as shown in Fig. 1, or it may be detachable from the support, as shown in Fig. 3.

In the construction of Fig. 3, the plow, a portion of the frame of which is shown and designated by the reference character 15, is provided with the standard or upright 16 at its rear, in the same manner as the standard 1ª of Fig. 1. The standard or upright is braced against the frame of the plow by an inclined brace 17. While it is obvious that the construction of Fig. 1 may be used with the plow 15, a modified construction is shown in connection with the plow. In this construction the blade 18 is a separate and independent element, being detachably connected to a blade support 19. The said support has a forwardly and upwardly bent shank 20, corresponding to the shank 5 of Fig. 1, and the shank is provided with a loop 21 for engaging the standard or upright 16. The angle bars 22—22ª are connected with the shank and the blade support in the same manner as the angle bars 9—9ª are connected with the shank and the blade in Fig. 1. The portion 22 of each angle bar is connected to the shank by a bolt 23, and the portions 22ª of the angle bars are connected to the blade support as indicated at 24. Each angle bar is provided with an opening 25 at the junction of the portion, corresponding to the openings 12 of Fig. 1 and for the same purpose. The blade 18 is provided with openings and the blade support 19 with registering openings for receiving bolts 26 for connecting the blade to the blade support. The blade is provided with an angular portion 18ª at its front end fitting against the shank, but the bolts 26 are engaged with the body of the blade. By removing the nuts of the bolts 26, the blade may be removed for resharpening or for repairs.

A beam 27 is secured to the frame of the plow, adjacent to the seat plate 28 of the plow, and the said beam extends rearwardly and outwardly and is braced against the frame of the plow at the upright by an inclined brace 32. One end of the brace 32 is secured to the frame of the plow at the upright by an angle plate 29, and the other end is secured to the beam.

A flexible member 30 as for instance, a chain, is arranged between the attachment and the rear end of the beam 27. One end of the chain is connected to the beam and the other end is connected to an opening in the adjacent angle bars 22—22ª.

The operation of the construction shown in Fig. 3 is precisely the same as that shown in Fig. 4, but the attachment is however, braced more firmly and more rigidly than in the construction of Fig. 1. The beam 27 and the inclined brace 32 together with the chain 30 absolutely prevents swinging movement of the attachment toward the wheel. If desired, a weight may be connected with the attachment shown in Fig. 3 in the same manner as with the attachment shown in Fig. 1.

I claim:—

1. An attachment for disk plows, comprising a blade having a shank at its front end extending upwardly and forwardly from the blade and provided at its front end with a forwardly extending loop for engaging the frame of the plow, said blade having its lower edge beveled, a plate extending downwardly from the front end of the shank and adapted to engage the rear axle of the disk plow, angle bars connected with the blade and the shank, each bar consisting of two portions extending at an obtuse angle with respect to each other, one of the said portions being approximately vertical and connected to the blade intermediate its ends, and the other being approximately horizontal and lapping on the adjacent side of the shank at the junction of the loop therewith and at the plate, a bolt passing through the shank, the angle bars and the plate for securing them together, said bars being spaced apart at the junction of the portions.

2. An attachment for disk plows, comprising a blade having a forwardly and upwardly extending shank provided at its front end with a loop for engaging an upright on the frame of the plow, a plate rigidly connected to the shank near its junction with the loop and depending downwardly, and a pair of angle bars, the members of the pair being arranged on opposite sides of the shank and the blade, and each comprising an approximately vertical portion and an approximately horizontal portion, the vertical portions being lapped upon the blade intermediate its ends and secured thereto and the horizontal portions being lapped upon the shank and secured thereto, said bars being spaced apart at the junction of the portions.

3. An attachment for disk plows, comprising a blade having a forwardly and upwardly extending shank provided at its front end with a loop for engaging an upright on the frame of the plow, a plate rigidly connected with the shank near its junction with the loop and depending downwardly and adapted to engage the frame of the plow, and a plurality of braces arranged between the blade and the shank and connected at their ends to the blade and the shank and diverging from each other intermediate their ends for supporting a weight.

4. An attachment of the character specified, comprising a blade support having a forwardly and upwardly extending shank provided at its front end with a loop for engaging an upright support on the frame of a plow, a blade detachably connected with the support, the blade having an angular portion at its front end fitting against the adjacent portion of the shank, a pair of angle bars, the members of the pair being arranged on opposite sides of the shank and the blade support and each angle bar comprising an approximately vertical portion and an approximately horizontal portion, the vertical portions being lapped upon the blade support intermediate its ends and secured thereto, and the horizontal portion being lapped upon the shank and secured thereto, said bars being spaced apart at the junction of the portions, a rigid beam for connection with the plow, said beam extending rearwardly and outwardly, a brace between the beam and the point of connection of the front end of the attachment, and a flexible member between the outer end of the beam and the blade support.

5. An attachment of the character specified, comprising a blade support having a forwardly and upwardly extending shank provided at its front end with a loop for engaging an upright on the frame of a plow, a blade detachably connected with the support, a pair of angle bars, the members of the pair being arranged on opposite sides of the shank and the blade support and each angle bar comprising an approximately vertical portion and an approximately horizontal portion, the vertical portions being lapped upon the blade support intermediate its ends and secured thereto, and the horizontal portions being lapped upon the shank and secured thereto, said bars being spaced apart at the junction of the portions, a rigid support for connection with the plow and extending rearwardly, and a flexible connection between the rear end of the support and the blade support.

6. An attachment of the character specified, comprising a blade support having a shank offset upwardly from the support, said support having a blade, angle bars arranged on opposite sides of the shank and the support and connected thereto, said bars diverging from the shank and the support, the shank having a loop for engaging an upright on the frame of a disk plow to permit the support to swing laterally on a vertical axis.

7. An attachment of the character specified, comprising a blade support having a shank offset upwardly from the support, said support having a blade, angle bars arranged on opposite sides of the shank and the support and connected thereto, said bars diverging from the shank and the support for permitting the support to be connected to the frame of a disk plow.

8. An attachment of the character specified, comprising a runner for engaging a furrow, said runner having an upwardly offset loop, said loop being adapted to engage a vertical portion of the cultivator to permit the runner to swing laterally, and means in connection with the runner for supporting a weight, said means being above the runner.

IRENE DESY.

Witnesses:
RUDOLF VON TOBEL,
ASHER C. BIDDLE.

Copies of this patent may be obtained for five cents each, by addressing the "Commissioner of Patents, Washington, D. C."